US006953830B2

(12) United States Patent
Chou

(10) Patent No.: US 6,953,830 B2
(45) Date of Patent: Oct. 11, 2005

(54) FLUORINE-CONTAINING ETHYLENE COPOLYMERS

(75) Inventor: Richard T. Chou, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/469,293

(22) PCT Filed: Mar. 7, 2002

(86) PCT No.: PCT/US02/07058

§ 371 (c)(1),
(2), (4) Date: Aug. 28, 2003

(87) PCT Pub. No.: WO02/072648

PCT Pub. Date: Sep. 19, 2002

(65) Prior Publication Data

US 2004/0077811 A1 Apr. 22, 2004

Related U.S. Application Data

(60) Provisional application No. 60/273,912, filed on Mar. 7, 2001.

(51) Int. Cl.[7] .................................................. C08F 12/20
(52) U.S. Cl. ........................ 526/242; 428/421; 524/544; 525/276; 525/340

(58) Field of Search .......................... 526/242; 428/421; 524/544; 525/276, 340

(56) References Cited

U.S. PATENT DOCUMENTS

| 4,065,613 | A | * | 12/1977 | Logothetis ............... 526/292.6 |
| 5,096,962 | A | * | 3/1992 | Holmes-Farley et al. ... 524/742 |
| 5,210,166 | A | * | 5/1993 | Ziegler et al. ............ 526/307.5 |
| 5,582,918 | A | * | 12/1996 | Gouard eres ................ 428/421 |
| 6,165,559 | A | * | 12/2000 | McClain et al. .......... 427/388.1 |
| 6,476,114 | B2 | * | 11/2002 | Goeman et al. ............ 524/462 |

FOREIGN PATENT DOCUMENTS

| WO | WO-99/25760 | * | 5/1999 |

* cited by examiner

*Primary Examiner*—David W. Wu
*Assistant Examiner*—Henry Hu
(74) *Attorney, Agent, or Firm*—Kevin S. Dobson

(57) ABSTRACT

The present invention is a fluorine containing ethylene copolymer obtained by the copolymerization of ethylene with suitable fluorine-containing comonomer compounds, wherein the fluorine-containing comonomer compound is present at a concentration of up to 40% by weight, based on the total weight of the ethylene copolymer.

25 Claims, No Drawings

FLUORINE-CONTAINING ETHYLENE COPOLYMERS

This application claims the benefit of U.S. Provisional Application No. 60/273,912, filed Mar. 7, 2001.

BACKGROUND OF THE INVENTION

1. Field of the Invention

The present invention relates to ethylene copolymers. This invention particularly relates to fluorine-containing ethylene copolymers and products made therefrom.

2. Description of the Related Art

Fluoropolymer compositions are widely used for surface modification, as agents to impart desirable surface properties to various types of surfaces. For example, fluoropolymer compositions can impart or enhance the water and oil repellency of certain surfaces, including fabrics and upholstery. However, surface treatment using fluoropolymers can involve complex processing steps to ensure that the fluoropolymer is applied and bonded to the surface being treated. The process can be difficult and expensive. Organic solvent vapors can be released to the atmosphere during the processing. Surface treatment can involve high temperature curing of the fluoropolymer to the substrate surface.

To impart water and oil repellency, fluorochemicals or fluoropolymers can be dissolved or dispersed either in organic solvents or in water. For example, mixtures of fluorinated copolymers, mainly comprising perfluoroalkyl methacrylate, and vinyl copolymers are disclosed in U.S. Pat. No. 3,277,039. U.S. Pat. No. 2,803,615 discloses acrylate/methacrylate esters of N-alkyl or N-alkanol perfluoroalkanesulfonamides used to impart grease and oil repellency. Fluorochemical compositions for treating textile fibers and fabrics comprising an aqueous solution or dispersion of a fluorochemical acrylate and a polyalkoxylated polyurethane having pendant perfluoroalkyl groups is described in U.S. Pat. No. 5,350,557. U.S. Pat. No. 5,536,304 describes a composition for imparting water and oil repellency comprising a fluoroaliphatic radical containing agent, and a cyclic carboxylic acid anhydride-containing polysiloxane.

Fluorochemicals can be melt-blended with thermoplastic polymers, and thereby impart water and oil repellency to the polymer by migrating to the polymer surface as described in, for example, U.S. Pat. No. 5,025,052, wherein the preparation of fluoroaliphatic radical-containing oxazolidinone compositions for blending with thermoplastic polymers is described. U.S. Pat. No. 5,380,778 describes thermoplastic compositions comprising fluoroaliphatic radical containing aminoalcohols and a thermoplastic synthetic organic polymer.

Ethylene copolymers are useful polymeric materials in many applications. Ethylene copolymers can find use in applications such as packaging, laminate films, and adhesives for example. Conventional polyolefins such as polypropylene, polyethylene, and conventional ethylene copolymers have high surface tension relative to fluoropolymers such as polytetrafluoroethylene, for example. As a result, for applications wherein water and oil repellency is important, articles made from polyolefins must be treated to attain a satisfactory level of repellency. However, due to their relatively low melting point and lack of reactive functional groups, treatment of polyolefins with fluorochemicals or fluoropolymers is, in general, much more difficult than treating other thermoplastic polymers.

Copolymers of ethylene and fluorine-containing monomers are known. For example, Tefzel®, manufactured by E.I DuPont de Nemours and Company, is a copolymer of ethylene and tetrafluoroethylene. Copolymers of this type are very different from conventional polyethylene copolymers in many aspects. For example, fluorine-containing ethylene copolymers are typically melt-processable only at much higher temperature than conventional ethylene polymers and ethylene copolymers, and the properties of fluorine-containing ethylene copolymers differ form conventional ethylene copolymers. Copolymers of this type are not amenable to manufacture or processing under the type of conditions used to manufacture and process conventional ethylene copolymers. Ethylene/fluoromonomer copolymers of this type are not compatible in systems that currently use polyethylene copolymers. For example, known conventional ethylene/tetrafluoroethylene copolymers have no adhesion to polyethylene.

It would be desirable to have a fluorine-containing ethylene copolymer that can be processed in the same way as conventional ethylene copolymers.

It would be desirable to have a melt-processable fluorine-containing ethylene copolymer.

It would be desirable to have a fluorine-containing ethylene copolymer that has a low surface tension.

It would be desirable to have a fluorine-containing ethylene copolymer that can be compatible with, or used in place of conventional ethylene copolymers.

It would be desirable to have a laminate film having at least one layer of a fluorine-containing ethylene copolymer.

It would be desirable to have at least a composite fiber having at least one component of a fluorine-containing ethylene copolymer.

SUMMARY OF THE INVENTION

In one aspect the present invention is a fluorine containing ethylene copolymer obtained by the copolymerization of ethylene with suitable fluorine-containing comonomer compounds, comprising: from about 0.5 wt % to about 40 wt % of a fluorine-containing comonomer compound and from about 30 wt % to about 99.5 wt % ethylene.

In another aspect the present invention is a melt-processable ethylene copolymer blend comprising a fluorine containing ethylene copolymer obtained by the copolymerization of ethylene with suitable fluorine-containing comonomer compounds, wherein the fluorine-containing comonomer compound is present at a concentration of up to 40% by weight, based on the total weight of the ethylene copolymer, and wherein the blend comprises from about 5 to about 95%, by weight, fluorine-containing ethylene copolymer based on the total weight of the blend.

In another aspect the present invention is an article of manufacture, including a molded part, a blown film, a woven or a non-woven fiber, or a multilayer composite film, comprising a fluorine containing ethylene copolymer obtained by the copolymerization of ethylene with at least one suitable fluorine-containing comonomer compound, wherein the fluorine-containing comonomer compound is present at a concentration of up to 40% by weight, based on the total weight of the ethylene copolymer.

DETAILED DESCRIPTION OF THE INVENTION

In one embodiment, the present invention is a fluorine-containing ethylene copolymer. Ethylene copolymers of the present invention include up to about 40% by weight, based on the total weight of the copolymer (wt %), of a suitable fluorine-containing monomer. Preferably the fluorine-containing comonomer is from about 2 to about 30 wt % of the copolymer. More preferably, the fluorine-containing comonomer is from about 10 to about 25 wt % of the copolymer.

The copolymer comprises from about 30 wt % to about 99.5 wt % ethylene comonomer. Preferably the copolymer comprises from about 40 wt % to about 95 wt % ethylene comonomer, more preferably from about 50 wt % to about 90 wt % ethylene comonomer, and most preferably from about 70 wt % to about 90 wt % ethylene comonomer.

The copolymer can optionally comprise other comonomers. A copolymer, as the term is used herein, is a polymer obtained by the polymerization of at least two comonomers. A comonomer, as the term is used herein, is any monomer that is polymerized in the presence of at least one other monomer to produce a copolymer of the present invention. For example, a copolymer can be the product of polymerization of two, three, four, or five comonomers, or more. Where the concentration of all but one of the comonomers is specified, the concentration of the remaining comonomer can be deduced by subtraction of the known constituents from 100 wt %, that is, the total wt % of the copolymer.

Suitable fluorine containing comonomers are described in U.S. Pat. Nos. 2,803,615; 2,642,416; 2,826,564; 3,102,103; 3,282,905; and 3,304,278, for example. Suitable fluorine-containing comonomers are fluorinated acrylate or methacrylate esters of the general formula: Cf—L—O—CO—CR=CH$_2$, wherein:

(i) Cf is a fluorinated aliphatic group having at least 4 carbon atoms wherein the aliphatic group can be: straight chain or branched; acyclic or cyclic; and can include heteroatoms such as nitrogen, oxygen, and/or sulfur. It is preferable that Cf is a perfluorinated aliphatic group of the formula $C_nF_{2n+1}$, wherein n is an integer from 4 to 20;

(ii) L is a linking group that connects the fluorinated aliphatic group with the (meth)acrylate group, wherein L can contain from 1 to 10 carbon atoms, and can optionally include oxygen, nitrogen, or sulfur-containing groups, or combinations thereof; L can be straight-chain or branched, cyclic alkylene, arylene, arylalkylene, sulfonyl, sulfoxy, sulfonamide, carboxyamino, carbonyloxy, urethanylene, or combinations thereof.

For example, a fluorine-containing monomer suitable for use in the present invention can include:

CF$_3$—(CF$_2$)$_n$—CH$_2$—CH$_2$—O—CO—CH=CH$_2$;
CF$_3$—(CF$_2$)$_n$—CH$_2$—CH$_2$—O—CO—C (CH$_3$)=CH$_2$;
CF$_3$—(CF$_2$)$_3$—CH$_2$—O—CO—CH=CH$_2$;
CF$_3$—(CF$_2$)$_3$—CH$_2$—O—CO—C (CH$_3$)=CH$_2$;
CF$_3$—(CF$_2$)$_5$—CH$_2$—O—CO—CH=CH$_2$;
(CF$_3$)$_2$—CF—(CF$_2$)$_5$—CH$_2$CH$_2$—O—CO—CH=CH$_2$;
CF$_3$—(CF$_2$)$_7$—SO$_2$N(CH$_3$)—CH$_2$—CH$_2$—O—CO—CH=CH$_2$;
CF$_3$—(CF$_2$)$_7$—SO$_2$N(CH$_2$CH$_3$)—CH$_2$—CH (CH$_3$)—O—CO—CH=CH$_2$;
CF$_3$—(CF$_2$)$_5$—SO$_2$N(CH$_3$)—CH$_2$—CH$_2$—O—CO—CH=CH$_2$; and
(CF$_3$)$_2$—CF(CF$_2$)$_4$—SO$_2$N(CH$_3$)—CH$_2$—CH$_2$—O—CO—CH=CH$_2$, wherein n is an integer from 3 to about 20. Mixtures or physical combinations of comonomers described by the general formulas above are contemplated to be within the scope of the present invention. Furthermore, non-acrylic fluoroalkyl monomers can be used in the practice of the present invention, particularly when using transition metal catalysts.

Copolymers of the present invention can be prepared by conventional methods for polymerization or copolymerization of polyethylene polymers and copolymers. For example, copolymers of the present invention can be prepared by copolymerization of ethylene with fluorine containing comonomers described herein by high pressure free radical polymerization or, alternatively, by using low pressure transition metal catalysis. Using high pressure free radical polymerization is preferred herein. Conventional methods for preparing ethylene copolymers are described in patented literature and reference textbooks. For example, an ethylene copolymerization process is described in U.S. Pat. No. 4,351,931.

Copolymers of the present invention are melt-processable polymers and can be processed by methods used with conventional ethylene copolymers. For example, copolymers of the present invention can be molded, extruded, blown, or spun to yield molded parts, fibers, or films, for example, in the same manner as conventional polyethylene polymers and copolymers.

Unlike conventional ethylene copolymers, polymers of the present invention have low surface tension. Copolymers and copolymer blends of the present invention have surface tensions of less than those of conventional polyethylene and/or polypropylene polymers and copolymers. Copolymers (including blends) of the present invention have surface tensions of less than about 32 dyne/cm. Preferably, the surface tension is less than about 28 dyne/cm, and more preferably less than about 24 dyne/cm.

In another embodiment, the present invention is a terpolymer comprising in addition to the above comonomers, from about 0.5 wt % to about 5 wt % of a terpolymer X, wherein X is a reactive functional comonomer. For example, X can be glycidyl methacrylate, maleic anhydride, or a half-ester of maleic anhydride and/or derivatives thereof. Preferably, the terpolymer includes from about 1 wt % to about 4.5 wt % of X, more preferably from about 1.5 wt % to about 4 wt % of X. Most preferably the terpolymer comprises from about 2 wt % to about 4 wt % of X.

In still another embodiment, the present invention is a terpolymer comprising, in addition to the ethylene and fluoroalkyl comonomers described hereinabove, from about 0.5 wt % to about 50 wt % of a terpolymer Y, wherein Y is a vinyl acetate or an acrylate comonomer, such as methyl acrylate and butyl acrylate. Preferably Y is included in an amount of from about 2 wt % to about 45 wt %, and more preferably from about 5 wt % to about 40 wt %. Most preferably, Y is included in an amount of from about 5 wt % to about 35 wt %. Preferably Y is a vinyl acetate monomer.

In another embodiment, the present invention is a terpolymer comprising, in addition to the ethylene and fluoroalkyl comonomers described hereinabove, from about 1.0 to about 20 wt % of a terpolymer Z, wherein Z is acrylic acid or methacrylic acid comonomer. Preferably Z is included in an amount of from about 1.5 wt % to about 18 wt %, and more preferably from about 2.5 wt % to about 17 wt %. Most preferably Z is included in an amount of from about 3 wt % to about 15 wt %.

In still another embodiment, the present invention is a fluorine-containing ethylene copolymer comprising, in addition to at least 40 wt % ethylene and from 0.5 wt % to about 40 wt % fluoroalkyl comonomer, any combination of at least two comonomers selected from the group consisting of X, Y, and Z in a total amount of from about 0.5 wt % to about 59.5 wt %. Preferably the two comonomers are present in a total amount of from about 2 wt % to about 50 wt %, more preferably in an amount of from about 5 wt % to about 45 wt %, and most preferably in an amount of from about 7 wt % to about 40 wt %. Preferably the combination includes Y.

In another embodiment, the present invention is a composite film that includes at least one layer of an ethylene/fluoroalkyl copolymer of the present invention. A composite film of the present invention can be obtained in the same manner as composite films comprising conventional polyethylene polymer or copolymer layers with other polymer layers. For example, U.S. Pat. No. 3,589,976 describes a process suitable for making the composite films of polystyrene polyolefins made by a coextrusion process. Composite films of the present invention can include laminate composite films, with or without adhesive layers.

In another embodiment, the present invention is a composite fiber that includes at least one component of an ethylene/fluoroalkyl copolymer of the present invention. A composite fiber of the present invention can be obtained in the same manner as composite fibers comprising conventional polymers. U.S. Pat. No. 3,329,557 describes a preparation of composite fibers of nylon and poly(ethylene terephthalate) for making antistatic filaments.

Copolymers of the present invention can be used alone or in blends with other polymers, for example, thermoplastic materials and thermoplastic elastomers. Polymers suitable for blending with copolymers of the present invention include, for example: polyamides, polyethylene terephthalate, polyurethane, polystyrene, polyethylene, ethylene copolymers, and polypropylene. Blends of the present invention include from about 1 wt % to about 99 wt % of the fluorine containing ethylene copolymer of the present invention. Preferably blends of the present invention comprise from about 5 wt % to about 95 wt % of the fluorine-containing ethylene copolymer, more preferably from about 10 wt % to about 90 wt %, and most preferably from about 20 wt % to about 80 wt %. Copolymers can be used in a process for making films or in a process for making woven or non-woven fibers, for example.

EXAMPLES

The following examples are merely illustrations of the present invention, and not intended to limit the scope of the present invention in any way.

Testing

Melt Index (MI) was measured using ASTM D1238 using a 2160 gram weight, and measured at 190° C. Melting Point was measured using Differential Scanning Calorimetry (DSC), using a DuPont Thermal analyzer.

Surface tension (surface energy) was measured on blown films of the Examples and the Comparison Examples using a Video Contact Angle System instrument, for AST PRODUCT, Inc. The film samples of 3–4 mil were made from a laboratory blown film equipment. Surface tension was calculated base on the Harmonic-Mean Method as described in Polymer Interface and Adhesion, Sougeng Wu, Marcel Dekker, Inc., 1982. Deionized water having a surface tension of 71.8 dynes/cm and methylene iodide having a surface tension of 50.8 dynes/cm were used in the contact angle measurements.

Analysis of fluorine content was by Ion Chromatography (IC). The samples were combusted in oxygen-filled sealed flasks. The combustion gases were collected in a weakly basic catch solution. The catch solution was taken to a known volume and analyzed by IC.

Compositions of ethylene/perfluoroalkyl (meth)acrylate copolymers were measured and calculated by fluorine content alone. Compositions that include vinyl acetate and methyl acrylate were measured by a combination of fluorine content analysis and infrared spectroscopy (IR).

Ethylene copolymers listed in Table 1 were prepared according to the following procedures. Ethylene was copolymerized in the presence of fluoroalkyl(meth)acrylate monomers. The free radical polymerizations were carried out at high pressure (27,000 psi) and a temperatures ranging from 160° C. to 250° C., in the presence of a peroxide free radical initiator.

Example C1 is not an example of the present invention, and is a copolymer of ethylene and methacrylic acid, prepared under the same conditions as the examples of the present invention.

Example 1 is a terpolymer of ethylene, methacrylic acid, and Zonyl® TA-N

Examples 2–6, Example 9 and Examples 11–19 are copolymers of ethylene and either Zonyl® TA-N or Zonyl® TM.

Examples 7 and 8 are terpolymers of ethylene, vinyl acetate, and Zonyl® TM.

Example 10 is a terpolymer of ethylene, methyl acrylate and Zonyl® TM. It is an amorphous polymer without a melting point.

The blends of fluorine-containing copolymers, Examples 20–26, are listed in Table 2. The blends were prepared in a 30 mm twin screw extruder.

Example C2 is not an example of this invention, and is a low density polyethylene with a MI of 4.4 and a melting point of 115° C.

Examples 20–21 and Examples 23–24 are blends of LDPE described in C2, and either Zonyl® TM or Zonyl® TA-N.

Example 22 is a blend of PP and Zonyl® TM. The PP is a polypropylene with a MI of 1.5 and a melting point of 166° C.

Examples 25–26 are blends of HDPE and Zonyl® TA-N. The HDPE is a high-density polyethylene with a MI of 0.6 and a melting point of 139° C.

Zonyl® TA-N and Zonyl® TM are both available from E.I. DuPont de Nemours and Company. Zonyl® TA-N is a perfluoroalkylethyl acrylate of the general formula: $C_nF_{2n+1}CH_2CH_2O(CO)CH=CH_2$, wherein n is an integer from 5 to about 20. Zonyl® TM is a perfluoroalkylethyl methacrylate of the general formula: $C_nF_{2n+1}CH_2CH_2O(CO)C(CH_3)=CH_2$, wherein n is an integer from 3 to about 20.

TABLE 1

Examples (Ex.) 1–19
Copolymers of Ethylene and
Perfluoroalkyl (meth) acrylate

| Ex. | Composition (wt %) | F content (wt %) | MI at 190° C. | Melting Point (° C.) | Surface Tension (dynes/cm) | Polymerization Temp (° C.) |
|---|---|---|---|---|---|---|
| C1 | E/MAA (90/10) | 0.0093 | 122 | 96 | 34.8 | 250 |
| 1 | E/MAA/TAN (89/10/0.6) | 0.4 | 96 | 96 | 31.3 | 250 |
| 2 | E/TAN (99.4/0.6) | 0.38 | 69 | 110.4 | 30.6 | 250 |
| 3 | E/TAN (99.2/0.8) | 0.52 | 29 | 110 | 28.63 | 250 |
| 4 | E/TM (99.5/0.5) | 0.3 | 82 | 111 | 30.1 | 250 |

TABLE 1-continued

Examples (Ex.) 1–19
Copolymers of Ethylene and
Perfluoroalkyl (meth) acrylate

| Ex. | Composition (wt %) | F content (wt %) | MI at 190° C. | Melting Point (° C.) | Surface Tension (dynes/cm) | Polymerization Temp (° C.) |
|---|---|---|---|---|---|---|
| 5 | E/TM (98.9/1.1) | 0.63 | 81 | 111 | 29.5 | 250 |
| 6 | E/TM (97.6/2.4) | 1.45 | 123 | 110 | 25.2 | 250 |
| 7 | E/VA/TM (71.9/24.5/3.6) | 1.98 | 43 | 72 | 26.2 | 210 |
| 8 | E/VA/TM (80/17.2/2.8) | 1.48 | 37 | 87 | 29 | 210 |
| 9 | E/TM (93.3/6.7) | 4.0 | 144 | 109 | 23.1 | 260 |
| 10 | E/MA/TM (34/62/3) | 1.78 | 14 | Amorphous | NA | 165 |
| 11 | E/TM 93.8/6.2) | 3.69 | 22 | 117.6 | 23 | 210 |
| 12 | E/TM (91.9/8.1) | 4.84 | 28 | 117.2 | 22 | 210 |
| 13 | E/TM (93.3/6.7) | 4 | 14 | 118.3 | 24.5 | 190 |
| 14 | E/TM (93.7/6.3 | 3.76 | 20 | 114 | 24.6 | 230 |
| 15 | E/TM (93.5/6.5) | 3.9 | 35 | 112 | 24.2 | 250 |
| 16 | E/TAN (93.4/6.6) | 4.2 | 16 | 114.3 | 24.6 | 210 |
| 17 | E/TAN (92.9/7.1) | 4.5 | 52 | 114 | 25 | 210 |
| 18 | E/TAN (88.4/11.6) | 7.4 | 80 | 112.7 | 22.3 | 210 |
| 19 | E/TAN (84.7/15.3) | 9.7 | 110 | 110 | 21 | 210 |

E = ethylene; TAN = Zonyl ® TA-N;
TM = Zonyl ® TM;
MAA = methacrylic acid;
VA = vinyl acetate
MA: methyl acrylate; F = fluorine.

TABLE 2

Surface Properties of Blends of
Ethylene/Perfluoroalkyl (meth) acrylate Copolymers

| Examples | Blend Composition (wt. %) | Surface Tension (dyne/cm) |
|---|---|---|
| C2 | LDPE | 33.6 |
| 20 | LDPE/Example 9 (80/20) | 25.5 |
| 21 | LDPE/Example 9 (60/40) | 24.2 |
| 22 | PP/Example 9 (80/20) | 27.0 |
| 23 | LDPE/Example 12 (60/40) | 24.1 |
| 24 | LDPE/Example 13 (60/40) | 23.7 |
| 25 | HDPE/Example 12 (60/40) | 26.2 |
| 26 | HDPE/Example 13 (60/40) | 24.7 |

What is claimed is:

1. A fluorine containing ethylene copolymer obtained by the copolymerization of ethylene with suitable fluorine-containing comonomer compounds, comprising: from about 0.5 wt % to about 40 wt % of a fluorine-containing comonomer compound and from about 30 wt % to about 99.5 wt % ethylene wherein:

(1) the fluorine-containing comonomers are fluorinated acrylate or methacrylate esters of the general formula: Cf—L—O—CO—CR═CH$_2$, wherein:
 (i) Cf is a fluorinated aliphatic group having at least 4 carbon atoms;
 (ii) L is a linking group that connects the fluorinated aliphatic group with the (meth)acrylate group, selected from the group consisting of:

—SO$_2$N(CH$_3$)—CH$_2$—CH$_2$—; and

—SO$_2$N(CH$_2$CH$_3$)—CH$_2$—CH(CH$_3$)—, and (iii) R is H or CH$_3$.

2. The copolymer of claim 1 wherein Cf is a perfluorinated aliphatic group of the general formula: $C_nF_{2n+1}$, wherein n is an integer of from 4 to about 20.

3. The copolymer of claim 1 additionally comprising: from about 0.5 to about 5 wt % of X, wherein X is a reactive functional comonomer.

4. The copolymer of claim 3 wherein X is a comonomer selected from the group consisting of: glycidyl methacrylate, maleic anhydride, or a half ester of maleic anhydride.

5. The copolymer of claim 4 wherein X is maleic anhydride or a half-ester of maleic anhydride.

6. The copolymer of claim 4 wherein X is glycidyl methacrylate.

7. The copolymer of claim 3 comprising: from about 1.0 to about 4.5 wt % of X.

8. The copolymer of claim 7 comprising: from about 1.5 to about 4.0 wt % of X.

9. The copolymer of claim 1 additionally comprising: from about 0.5 to about 50 wt % of Y, wherein Y is a vinyl acetate or an acrylate comonomer.

10. The copolymer of claim 9 comprising from about 2 wt % to about 45 wt % of Y.

11. The copolymer of claim 10 comprising from about 5 wt % to about 40 wt % Y.

12. The copolymer of claim 11 comprising from about 5 wt % to about 35 wt % Y.

13. The copolymer of claim 12 wherein Y is a vinyl acetate monomer.

14. The copolymer of claim 1 additionally comprising: from about 1.0 to about 20 wt % of comonomer Z, wherein Z is acrylic acid or methacrylic acid.

15. The copolymer of claim 14 comprising from about 1.5 wt % to about 18 wt % of comonomer Z.

16. The copolymer of claim 15 comprising from about 2.5 to about 17 wt % Z.

17. The copolymer of claim 16 comprising from about 3 wt % to about 15 wt % Z.

18. The copolymer of claim 16 wherein ethylene is present in an amount of from about 40 wt % to about 99.5 wt %, and the fluorine-containing comonomer is present in an amount of from about 0.5 wt % to about 40 wt %.

19. The copolymer of claim 1 wherein the copolymer is obtained by a process comprising the step: copolymerizing ethylene and a fluorine containing comonomer using high-pressure free radical polymerization.

20. A melt-processable ethylene copolymer blend comprising: (A) a fluorine containing ethylene copolymer obtained by the copolymerization of ethylene with suitable fluorine-containing comonomer compounds, wherein: (1) the fluorine-containing comonomer compound are fluorinated acrylate or methacrylate esters of the general formula: Cf—L—O—CO—CR═CH$_2$, wherein:
 (i) Cf is a fluorinated aliphatic group having at least 4 carbon atoms;
 (ii) L is a linking group that connects the fluorinated aliphatic group with the (meth)acrylate group, selected from the group consisting of:

—SO$_2$N(CH$_3$)—CH$_2$—CH$_2$—; and

—SO$_2$N(CH$_2$CH$_3$)—CH$_2$—CH(CH$_3$)—

(iii) R is H or CH$_3$ and (2) the fluorine-containing comonomer are present at a concentration of up to 40% wt %, and wherein the blend comprises from about 5 to about 95 wt % of the fluorine-containing ethylene copolymer, based on the total weight of the blend; and (B) a second polymer component, wherein the second polymer component is present in an amount of from about 5 wt % to about 95 wt % based on the weight of the blend.

21. The blend of claim 20 wherein (B) is a polyethylene polymer.

22. The blend of claim 20 wherein (B) is a polypropylene polymer.

23. The blend of claim 20 wherein (B) is an ethylene copolymer.

24. The blend of claim 20 wherein (B) is a thermoplastic polymer or thermoplastic elastomer.

25. An article of manufacture comprising a fluorine containing ethylene copolymer obtained by the copolymerization of ethylene with suitable fluorine-containing comonomer compounds, comprising: from about 0.5 wt % to about 40 wt % of a fluorine-containing comonomer compound and from about 30 wt % to about 99.5 wt % ethylene wherein:

(1) the fluorine-containing comonomers are fluorinated acrylate or methacrylate esters of the general formula: Cf—L—O—CO—CR=CH$_2$, wherein:

(i) Cf is a fluorinated aliphatic group having at least 4 carbon atoms;

(ii) L is a linking group that connects the fluorinated aliphatic group with the (meth)acrylate group, selected from the group consisting of:

—SO$_2$N(CH$_3$)—CH$_2$—CH$_2$—; and

—SO$_2$N(CH$_2$CH$_3$)—CH$_2$—CH(CH$_3$)—, and (iii) R is H or CH$_3$.

* * * * *